United States Patent [19]

Humphries, Sr.

[11] Patent Number: 4,674,307
[45] Date of Patent: Jun. 23, 1987

[54] AUTO ANTI THEFT DEVICE

[76] Inventor: Donald Humphries, Sr., 215 E. Jefferson St., Pittsburgh, Pa. 15212

[21] Appl. No.: 899,663

[22] Filed: Aug. 25, 1986

[51] Int. Cl.⁴ .......................................... E05B 49/00
[52] U.S. Cl. ................................ 70/278; 70/DIG. 49
[58] Field of Search ................. 70/277, 278, 405, 409, 70/279-282, DIG. 49; 340/825.32; 361/269

[56] References Cited

U.S. PATENT DOCUMENTS 4,390,758 6/1983 Hendrickson ......................... 70/277
4,495,484 1/1985 Kawakatsu ........................... 70/237

Primary Examiner—Robert L. Wolfe
Attorney, Agent, or Firm—William J. Ruano

[57] ABSTRACT

An anti-theft device comprising a compartment having lowermost spring plate with spring clips, some of which have insulating tops, others having metallic tops so that if an incorrect anti-theft card is used, it will raise the contacts energizing the top plate to sound an alarm by energizing the horn and at the same time energizing the relay making it impossible to complete the starter circuit by the ignition switch.

4 Claims, 5 Drawing Figures

AUTO ANTI THEFT DEVICE

This invention relates to a device and system for preventing theft of automotive vehicles.

BACKGROUND OF THE INVENTION

Anti-theft devices for vehicles are known. However, these generally are not truly tamper-proof, therefore they may be easily circumvented.

Another disadvantage is that they involve complicated parts which are costly to manufacture and maintain.

An object of the present invention is to provide a novel device and system for overcoming the above mentioned disadvantages.

SUMMARY OF THE INVENTION

The device of the present invention is operated by an anti-theft plastic card, much like a credit card, that has one or more wire strips that will complete the ignition circuit only if the proper card is used and will complete an alarm circuit and prevent operation of the ignition circuit if an improper card is used. The anti-theft card has raised contacts that will raise spring clips having electrically insulated tops engaging a metal top plate so as to prevent energization thereof and of the alarm circuit and at the same time will complete the ignition circuit. If an improper card is used, the top plate is energized by raising uninsulated spring clips which will energize the top plate and complete a circuit through a normally closed relay to open the ignition circuit and at the same time will complete a circuit to the horn to alert that the car is being stolen.

DETAILED DESCRIPTION OF A PREFERRED EMBODIMENT

Figure 1:
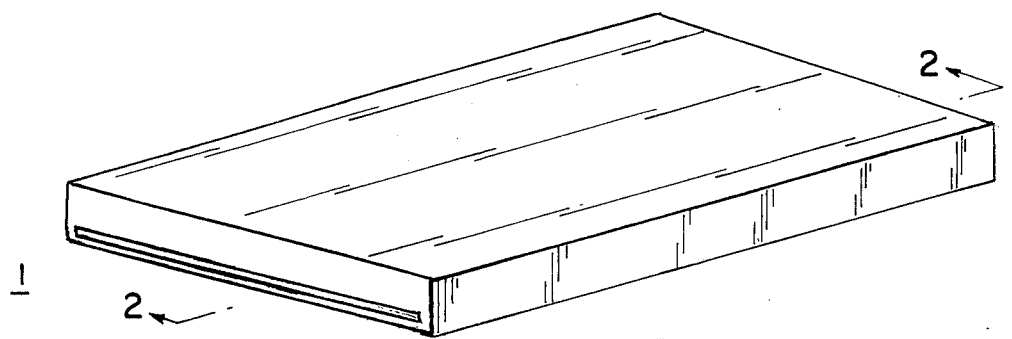
FIG. 1. is a top perspective view of the anti-theft device of the present invention.
Figure 3:
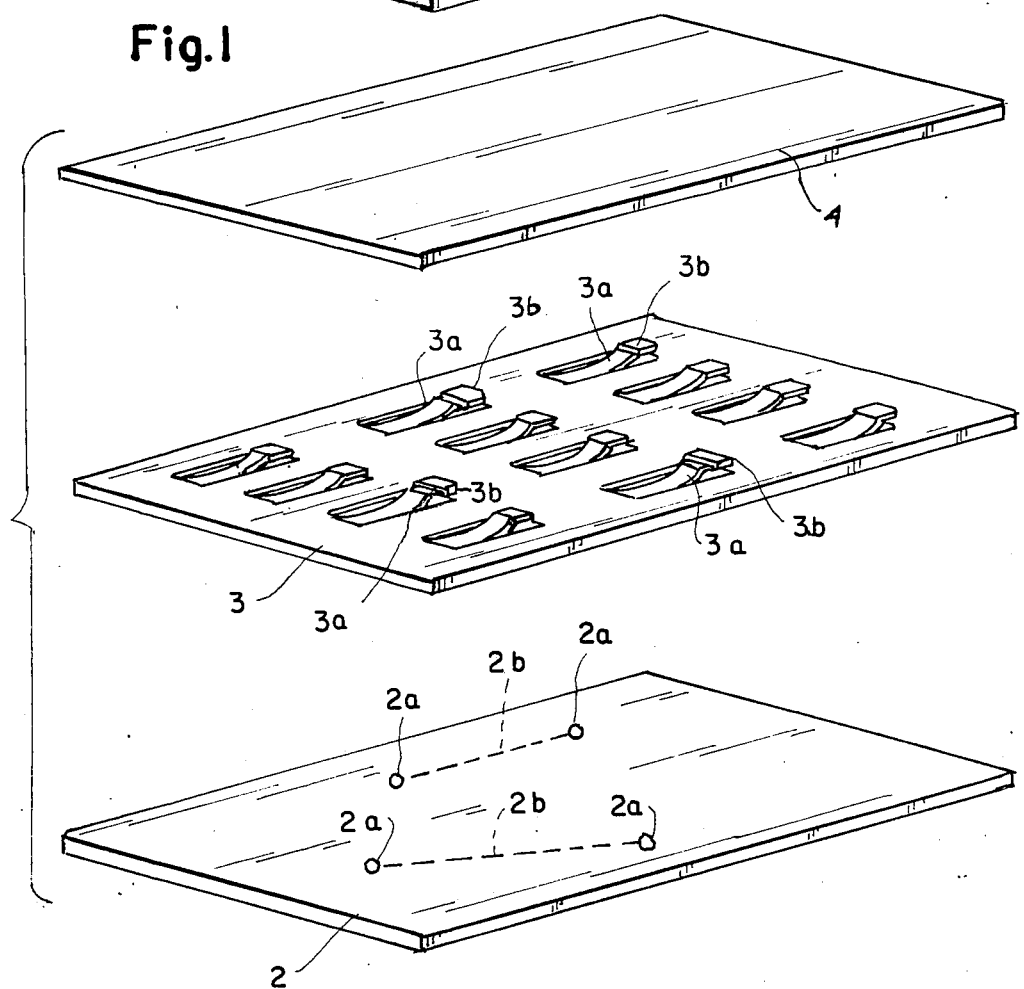
FIG. 3. is an exploded view of the parts of the anti-theft device of the present invention to more clearly illustrate the function and operation.
Figure 2:
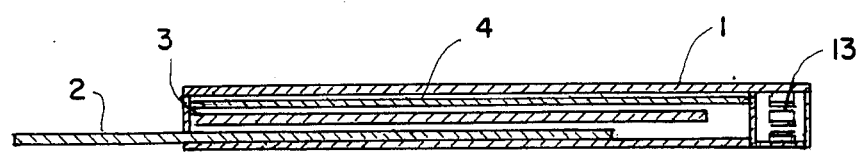
FIG. 2. is a longitudinal cross sectional view taken along line 2—2 of FIG. 1.

Referring more particularly to FIGS. 1, 2 and 3, numeral 1 denotes a rectangular case for enclosing a lowermost anti-theft or control card 2 having upstanding projections 2a at the end of embedded wires 2b which push up against corresponding spring clips 3a struck up from a spring metal plate 3.

When a proper anti-theft card 2 is used, the corresponding spring clips 3a raised by the projections 2a will have insulating tops 3b which will bear against the metallic plate 4, but will not complete the circuit therethrough. Therefore, metal plate 4 will not form part of the completed circuit and instead by virtue of inserting the missing gaps in the circuit completed by embedded wires 2b of the card the circuit will be completed to the ignition switch and starter as shown in FIG. 4.

Figure 5:
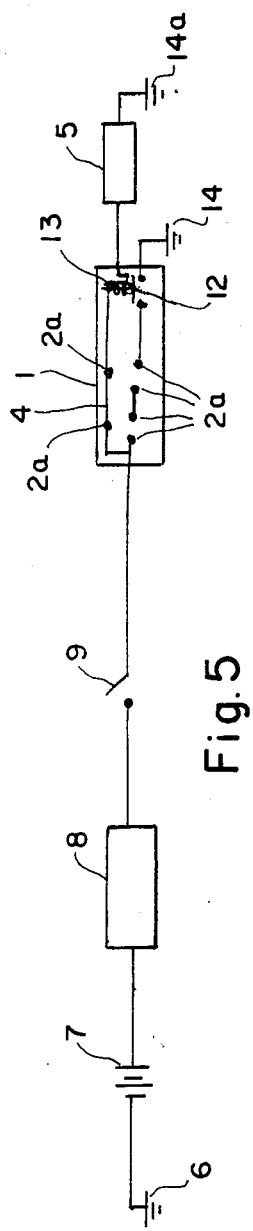
FIG. 5 shows the circuit when an improper anti-theft card is used.

However, if an incorrect anti-theft card 2 is used, which raises the incorrect spring clips, that is, those having no top insulating portions, but merely metallic portions, these will complete a circuit to the top metallic plate 4 which, as shown in FIG. 5, will complete a circuit to horn circuit 5 to sound an alarm, and, at the same time, will complete a circuit through a normally closed relay 13 in the ignition circuit so as to open it and prevent the possibility of starting the car. It will be noted that all the vital parts including the relay 13 are contained in the box or compartment 1 which is mountable on the dashboard of the auto.

Figure 4:
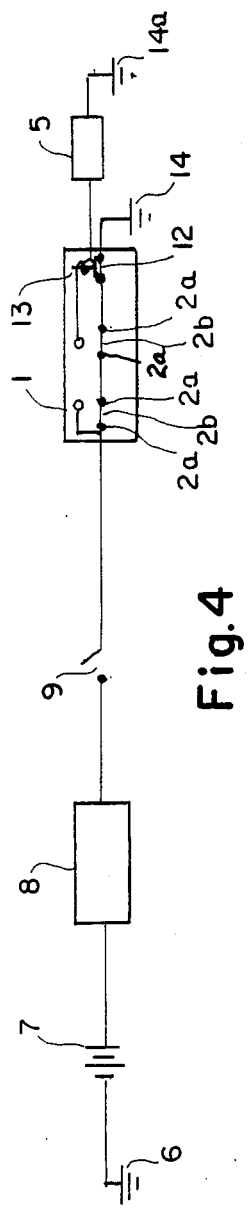
FIG. 4. is a schematic circuit diagram embodying the device of FIGS. 1–3 and illustrating the ignition circuit as being completed when a proper anti-theft card is used.

The above described operation will become more apparent from the following detailed description of FIGS. 4 and 5.

Referring to FIG. 4 the ignition circuit may be traced from ground 6, battery 7, starter 8, ignition switch 9, through bridging wires 2b provided by the correct card through the closed contacts 12 of relay 13 and finally through ground 14 completing the starter circuit.

FIG. 5 shows the circuitry when an incorrect anti-theft card is used, which circuit may be traced from ground 6, battery 7, starter 8, ignition switch 9, top plate 4, relay coil 13 and horn 5 and ground 14a therefore sounding an alarm by the horn 5. At the same time, because of energization the relay coil 13 there is a break in the ignition circuit at contacts 12, therefore, the ignition circuit cannot be completed.

It will be apparent that the box 1 may be mounted on the dashboard or steering column of the auto. Of course, when other card users are provided with a card, their code will be different from that of any other vehicle so as to complete different parts of circuitry enabled by the numerous contacts and springs 3a. One or more embedded wires 2b may be used in the card.

Thus it will be seen that I have provided a very reliable anti-theft and circuit for a car or other vehicle or conveyance which requires for its operation, a proper anti-theft card and whereby an improper anti-theft card would energize a top plate which will complete a circuit to a horn, bell or other alarm and at the same time will break the normally closed relay circuit and make it impossible for the starter circuit to be completed.

I claim:

1. In an automotive circuit including a battery, ignition switch and starter connected in series; the improvement comprising an anti-theft device in series therewith comprising a sealed box enclosing a plurality of upstanding spring clips for completing a circuit through a metallic plate located in said box above said clips only when an anti-theft coded card having a plurality of coded upstanding projections raises the correct spring clips, whereby the starter is energized.

2. In the circuit recited in claim 1 together with a relay and horn in series therewith, wherein certain of said upstanding spring clips have insulated tops which engage said plate when a proper coded card is inserted in said anti-theft device to prevent completion of a circuit through said plate, and when other spring clips which are devoid of insulated tops are raised by said coded card, indicating an improper card, a circuit is completed through said plate to said horn to sound an alarm and complete a circuit through said relay to interrupt the circuit to said starter.

3. A circuit as recited in claim 2 wherein said coded card is provided with at least one metallic strip at the end of which, said coded upstanding projections are connected as raised terminals, which said raised terminals complete a circuit to the starter when a proper coded card is used, and alternatively complete a circuit through said plate and horn when an improper coded card is used.

4. A circuit as recited in claim 3 wherein a plurality of metallic strips are provided which are embedded in said coded card, each terminating at both ends with said raised terminals for completing said circuit through said plate.

* * * * *